(12) United States Patent
Annunziato et al.

(10) Patent No.: US 7,873,375 B2
(45) Date of Patent: Jan. 18, 2011

(54) METHOD FOR THE LOCATION OF MOBILE TERMINALS, RELATED SYSTEMS AND TERMINAL, COMPUTER PROGRAM PRODUCTS THEREOF

(75) Inventors: Armando Annunziato, Turin (IT); Stefano Salio, Pino Torinese (IT)

(73) Assignee: Telecom Italia S.p.A., Milan (IT)

( * ) Notice: Subject to any disclaimer, the term of this patent is extended or adjusted under 35 U.S.C. 154(b) by 566 days.

(21) Appl. No.: 10/560,425

(22) PCT Filed: Jun. 17, 2003

(86) PCT No.: PCT/EP03/06381
§ 371 (c)(1),
(2), (4) Date: Dec. 14, 2005

(87) PCT Pub. No.: WO2005/004517
PCT Pub. Date: Jan. 13, 2005

(65) Prior Publication Data
US 2006/0128396 A1  Jun. 15, 2006

(51) Int. Cl.
*H04W 24/00* (2009.01)
*H04W 24/02* (2009.01)

(52) U.S. Cl. .............. 455/456.6; 455/456.1; 455/456.2; 455/457

(58) Field of Classification Search ... 455/456.1–456.3, 455/456.6, 456.7
See application file for complete search history.

(56) References Cited

U.S. PATENT DOCUMENTS 5,774,829 A * 6/1998 Cisneros et al. ............. 701/213
6,055,477 A * 4/2000 McBurney et al. .......... 701/207

(Continued)

FOREIGN PATENT DOCUMENTS

EP  1 102 398 A2  5/2001

(Continued)

OTHER PUBLICATIONS

Authors: Chin-Der Wann and Yi-Ming Chen; Title: Mobile location tracking with Velocity Estimation; Date: Sep. 3-6, 2002; pp. 566-571.*

(Continued)

*Primary Examiner*—Nick Corsaro
*Assistant Examiner*—Tangela T. Chambers
(74) *Attorney, Agent, or Firm*—Finnegan, Henderson, Farabow, Garrett & Dunner, L.L.P.

(57) ABSTRACT

A method for determining the location coordinates of a mobile terminal with respect to reference elements adapted to send toward the mobile terminal radioelectric signals involves the steps of measuring the radioelectric signals to derive respective measurements, the measurements being affected by measurement errors, and subjecting the measurements to state-based statistical filtering, such as, a Kalman filtering, to derive therefrom the location coordinates of the mobile terminal. At least some of the reference elements are terrestrial reference elements and in the statistical filtering at least one further state is included in addition to the coordinates. The further state is representative of the measurement errors. The terminal is adapted to be mounted on a vehicle, such as, a motorcar, and to have associated therewith a measurement source, such as, an altimeter adapted to provide additional measurements indicative of the location, e.g., the altitude, and/or the displacement of the mobile terminal.

26 Claims, 3 Drawing Sheets

U.S. PATENT DOCUMENTS

Figure 1:
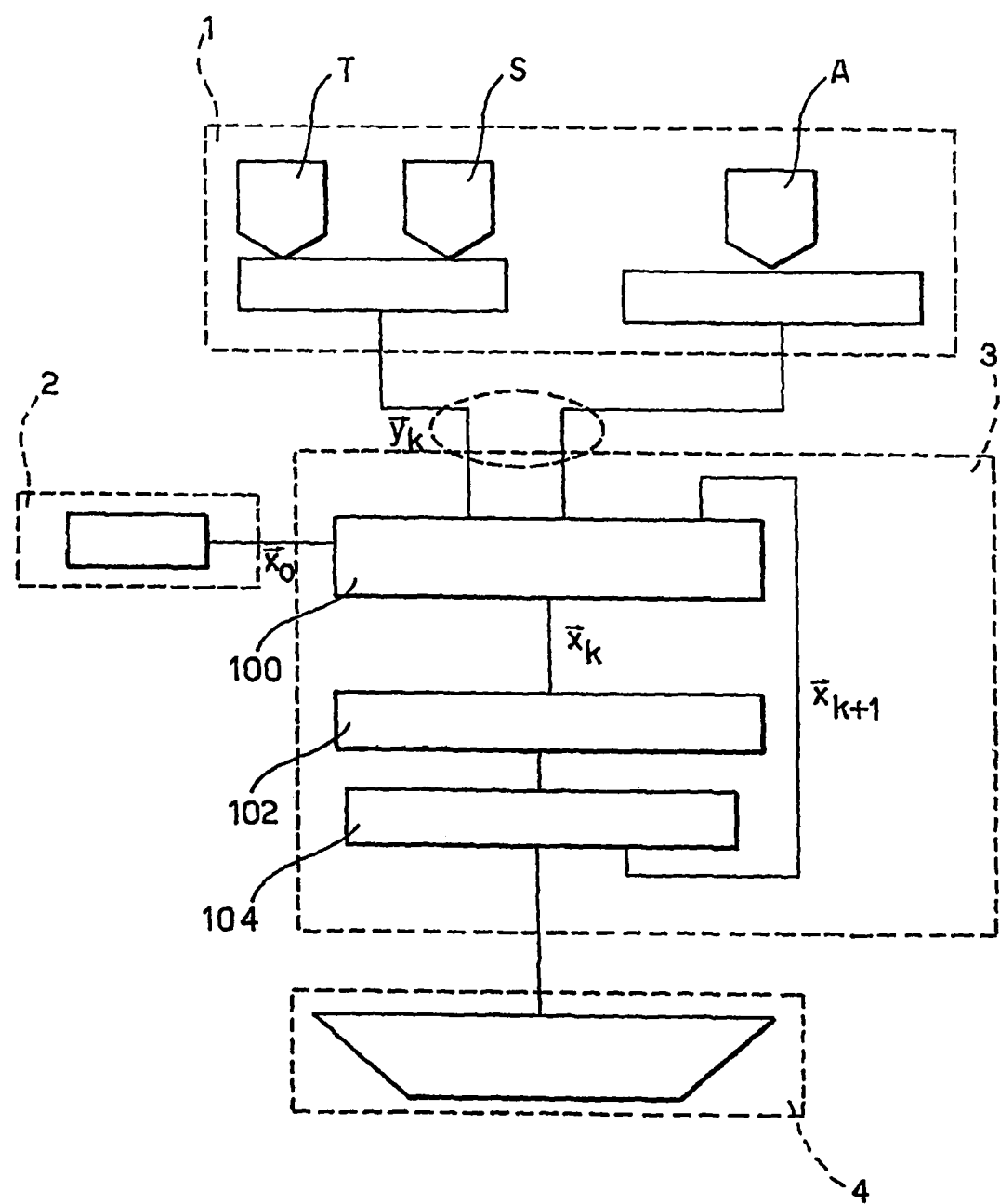

| | | | |
|---|---|---|---|
| 6,081,230 A * | 6/2000 | Hoshino et al. | 701/214 |
| 2002/0101912 A1 * | 8/2002 | Phelts et al. | 375/148 |
| 2002/0132626 A1 | 9/2002 | Tsunehara et al. | |
| 2003/0125046 A1 * | 7/2003 | Riley et al. | 455/456 |
| 2003/0146871 A1 * | 8/2003 | Karr et al. | 455/456 |
| 2007/0161383 A1 * | 7/2007 | Caci | 455/456.2 |

FOREIGN PATENT DOCUMENTS

| | | |
|---|---|---|
| EP | 1 102 399 A2 | 5/2001 |
| WO | WO 88/01409 | 2/1988 |
| WO | WO 0171372 A2 * | 9/2001 |
| WO | WO 0197547 A1 * | 12/2001 |

OTHER PUBLICATIONS

Authors: Hellebrandt, M. and Mathar, R.; Title: Location Tracking of Mobiles in Cellular Radio Networks; Date: Sep. 1999; vol. 48; No. 5; pp. 1558-1562.*

Alouani, A. T. et al., "A Two-Stage Kalman Estimator for State Estimation in the Presence of Random Bias and for Tracking Maneuvering Targets," Proceedings of the Conference on Decision and Control, vol. 1, Conf. 30, pp. 2059-2062, (Dec. 11, 1991).

Chmielewski, T. A. Jr., "On the Identification of Stochastic Biases in Linear Time Invariant Systems," Proceedings of the American Control Conference, pp. 4067-4071, (Jun. 1996).

Kelly, A., "A 3D State Space Formulation of a Navigation Kalman Filter for Autonomous Vehicles," CMU Technical Report, pp. 1-82, (May 2, 1994).

* cited by examiner

Fig_1

Fig_2

METHOD FOR THE LOCATION OF MOBILE TERMINALS, RELATED SYSTEMS AND TERMINAL, COMPUTER PROGRAM PRODUCTS THEREOF

CROSS REFERENCE TO RELATED APPLICATION

This application is a national phase application based on PCT/EP2003/006381, filed Jun. 17, 2003, the content of which is incorporated herein by reference.

1. Field of the Invention

The present invention relates to techniques for the location of mobile units or terminals.

2. Description of the Related Art

A number of techniques are known in the art that permit the location of mobile units in a given area; exemplary of such a system is the satellite-based positioning system known as the Global Positioning System (GPS).

Other arrangements exploit the features of certain terrestrial communication systems, such as cellular mobile telecommunication systems, for the location of mobile terminals.

Most location systems known in the art operate by taking distance measurements with respect to absolute references (or measurements, such as propagation time measurements of radio-frequency signals, that can be related to distance measurements), this approach being common both to satellite-based networks (such as GPS) and "terrestrial" networks.

Satellite-based location systems are also known that exploit different types of measurements with respect to those considered in the foregoing e.g. the displacement over a given time of the mobile system to be located. These additional measurements have the purpose of improving the accuracy of the location action.

Statistical filters have also been used in satellite-based location systems and most modern GPS receivers include a statistical filter. The related technical literature is quite extensive and includes a high number of scientific publications and patent publications as well.

Statistical filters have also been recently proposed for use in terrestrial-based location systems, as witnessed e.g. by EP-A-1 102 398 and EP-A-1 102 399.

Specifically, the arrangement disclosed in EP-A-1 102 398 includes a standard Kalman filter for use in a mixed satellite-based/terrestrial system. The same arrangement also takes advantage of statistical methods for pre-validating measurements, methods that associate to the measurements (taken individually or jointly) a degree of likelihood and, finally, methods for computing state innovations.

The arrangement disclosed in EP-A-1 102 399 is a further development over the arrangement described in EP-A-1 102 398 that includes a generalized use of statistical filters. These are used for determining a sequence of state estimates, these states representing the motion of the object to be located. As regards to the Kalman filter, also the "extended" form, for use in non-linear systems, was described. The same document additionally describes the use of statistical filters within purely terrestrial systems (such as Global System for Mobile communications (GSM) and Universal Mobile Telecommunications System (UMTS)) in addition to mixed satellite-terrestrial systems. Also, EP-A-1 102 399 indicates the possibility of dispensing with statistical methods for pre-validating measurements, which are presented as mandatory in EP-A-1 102 398.

To sum up, the prior art considered in the foregoing broadly and generally discloses the possible use of statistical filters (such as a Kalman filter) in location systems, such a disclosure applying to any kind of location system whose operation is based on measurements derived from terrestrial or satellite-based networks.

The prior art considered in the foregoing leaves however at least two basic problems unsolved.

As a first point, statistical filters intrinsically reduce in an optimal way measurement errors and any kind of environment-related error under the assumption that these errors have a well-known statistical distribution (in the case of Kalman filter, errors having a Gaussian distribution with a zero average or mean value are assumed). Experiences show however that when such arrangement are used in the case of measurements related to terrestrial cellular networks, the performance of the statistical filters is appreciably diminished to the point of making the use of such statistical filters practically useless.

Additionally, not unlike satellite-based systems (that may suffer from poor reception or lack of reception, i.e. lack of "visibility" of satellites in urban canyons and indoor), terrestrial systems may also be adversely affected by phenomena such as multipath or insufficient field strength, these phenomena possibly leading to environments where signals from both satellite-based and terrestrial location systems can be hardly received or are not received at all.

OBJECT AND SUMMARY OF THE INVENTION

The need therefore exists for arrangements that may improve the accuracy of the location action when the above-mentioned standard hypotheses on the statistical distribution of the measurement errors in statistical filters of conventional type are not met: as explained in the foregoing, this is the case of location effected by means of terrestrial cellular networks.

The need also exists for arrangements that may improve the accuracy in the location action in those geographical areas where signals from location system—of the terrestrial type or the satellite-based type—cannot be received satisfactorily.

The object of the present invention is to satisfy these needs.

According to the present invention, such an object is achieved by means of a method having the features set forth in the claims that follow. The invention also relates to corresponding system and a terminal for use therein, as well as a computer program product loadable in the memory of at least one computer and including software code portions for performing the method of the invention and/or implementing a terminal according to the invention when the product is run on a computer.

The invention lends itself to be implemented in a variety of different embodiments. These may range from a basic arrangement applied to a terrestrial-based location system and involving the use of an improved statistical filtering process, to more sophisticated arrangements that use an improved statistical filtering process within the framework of a location system using both satellite-based and terrestrial-based reference elements, in possible combination with additional measurements indicative e.g. of the altitude and/or the displacement (speed, acceleration, and so on.) of the mobile terminal. Still another embodiment of the invention may provide a location system using both satellite-based and terrestrial-based reference elements, in combination with additional measurements and a standard statistical filtering process.

A particularly preferred embodiment of the invention is a terminal for use in a vehicle such as a motorcar in a possible combination with a GPS receiver.

Essentially, the location system described herein is based on the use of statistical filters (hereinafter reference will be steadily made to a Kalman filter as exemplary of such types of filters or estimators) wherein, differently from the prior art considered in the foregoing, the system states include, in addition to information concerning the motion of the object to be located (for instance its location and speed) a plurality of states that are integrated in the statistical filters in order to optimize the accuracy of the location action. This also in those cases where the measurement errors in the networks have statistical distributions different from those typically hypothesized in the literature.

Preferably, the invention also provides for the optional use of additional measurements with respect to the measurements typically performed in terrestrial and/or satellite-based networks. These additional measurements (such as acceleration measurements) are provided by specific devices and adapted to improve the accuracy of the location action. Use of these additional measurements is established in the area of satellite-based systems, such as a GPS navigator: there, for instance, the location system is provided with information, concerning the distance over which the vehicle has traveled and this information, together with cartographic information, makes the location system significantly more accurate in comparison with respect to those situations where only the basic measurements provided in the GPS systems are used.

A preferred embodiment of arrangement disclosed herein provides for measurements to be carried out on signals from one or more base stations in a terrestrial cellular networks (for instance a GSM network) and, optionally, from base stations of a satellite-based system (such as GPS) with the possible optional use of additional information concerning movement of the system to be tracked as provided, for instance by accelerometers and altimeters.

As indicated, a preferred embodiment of the arrangement shown herein is based on the use of statistical filter such as a Kalman filter adapted to operate also in the case where the measurement errors appearing in the input data to the system have statistical distributions different from those statistical distributions (e.g. a Gaussian distribution with zero mean value) that are currently assumed in standard statistical filter theory.

Such an arrangement is therefore adapted to provide optimal results also in those cases where errors statistical distribution is different from that typically assumed in the known prior art. Exemplary of such a scenario are those situations where location is based on the propagation times of signals from a terrestrial cellular network in an environment affected by multipath propagation effects. Under these circumstances, the measurement error exhibits an average value (mean value) that is higher than zero and, therefore, can not lead to a Gaussian distribution with zero mean value. This is due to multipath being a condition only to increase—and not to reduce—propagation time with respect to the line of sight.

Accordingly, in a preferred embodiment of the arrangement disclosed herein, a fictitious additional state is provided that is adapted to represent such an error, having an higher than zero mean value, that is not usually contemplated in the conventional theory of statistical filters such as the common Kalman filters. In particular, the method according to present invention, enables the use of the kalman statistical filter in a cellular environment.

Moreover, the method enables to obtain good location results in a very fast time. In fact, due to the use of the Kalman filter with a non zero mean error value, the method guarantees very good performances in terms of both accuracy and speed of convergence (i.e. time necessary to elaborate the measurements for calculating the position), up to ten time the known solutions.

BRIEF DESCRIPTION OF THE ANNEXED DRAWINGS

Figure 2:
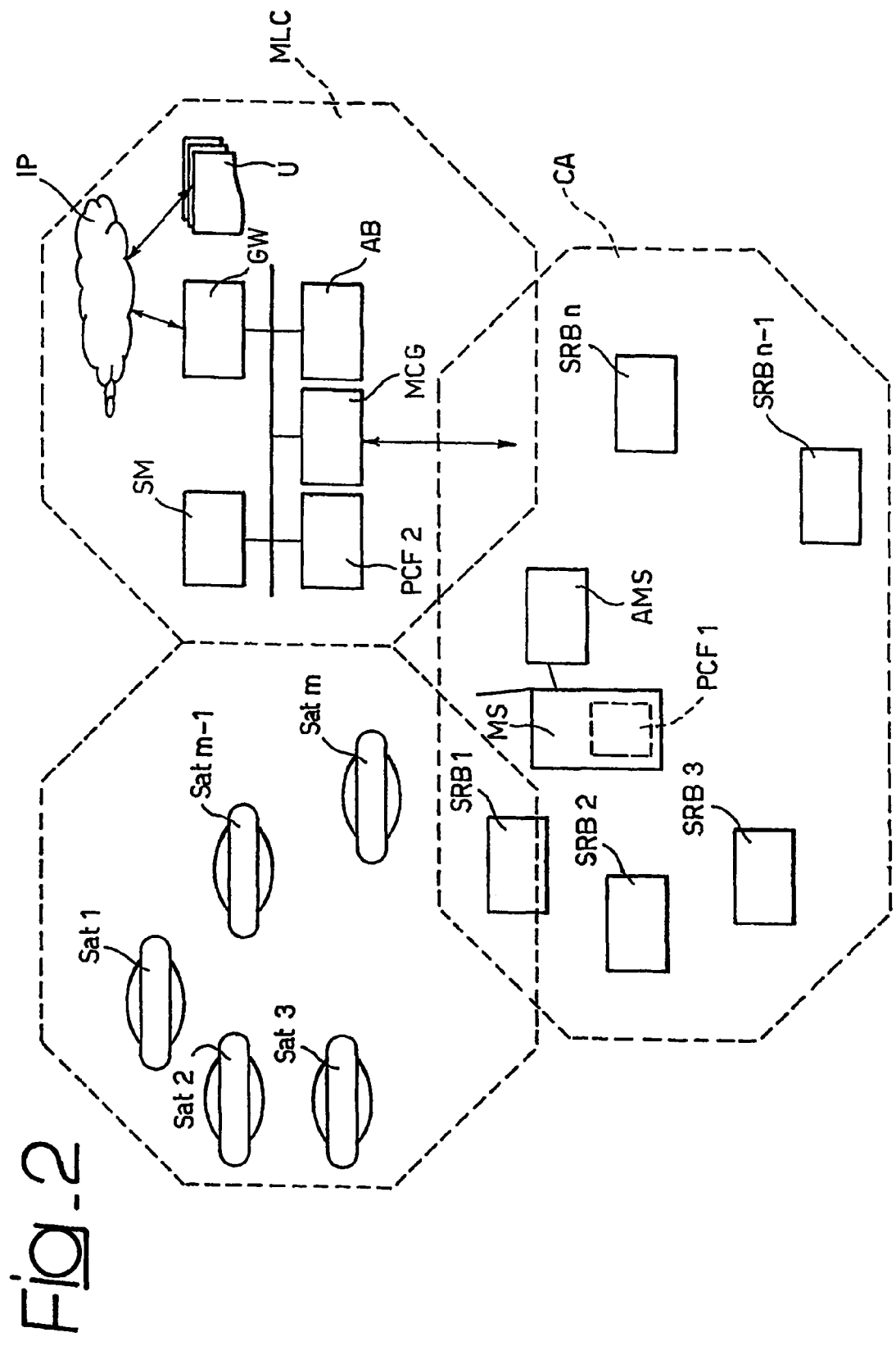
Figure 3:
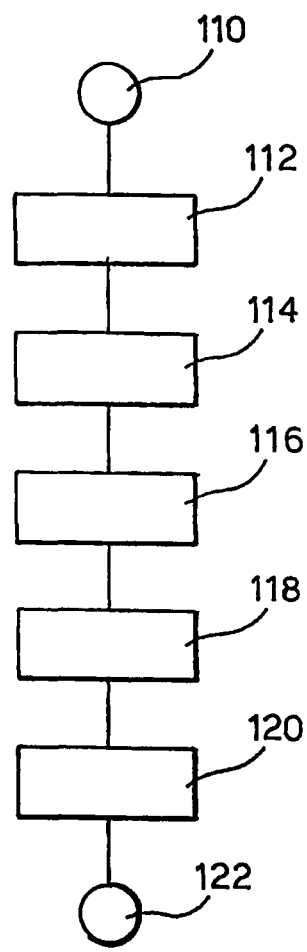
Figure 4:
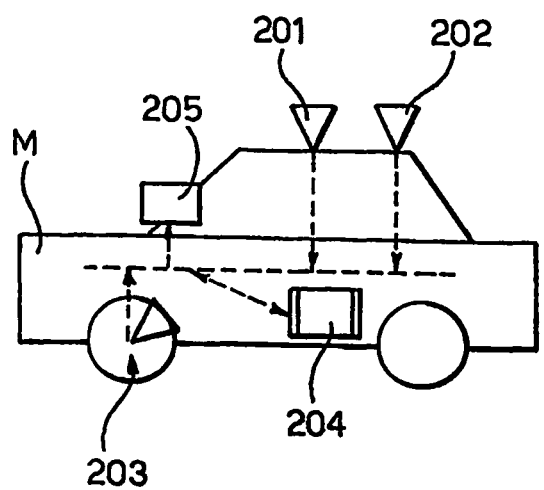

The invention will now be described, by way of example only, with reference to the annexed figures of drawing, wherein:

FIG. 1 is a functional diagram depicting operation of a location system as disclosed herein, FIG. 2 is a block diagram disclosing the general arrangement of such a system, FIG. 3 is a flow chart representative of certain processing steps performed in the location system as disclosed herein, and FIG. 4 schematically represents the possible application of the arrangement shown herein to a motor vehicle.

DETAILED DESCRIPTION OF PREFERRED EMBODIMENTS OF THE INVENTION

By way of introduction to the description of an exemplary embodiment of the arrangement disclosed herein, some basic principles of Kalman filter theory will be briefly summarized here. This is done by referring specifically to the arrangement known as the so-called "Extended Kalman Filter" or, briefly, EKF.

Once again, it is worth recalling that reference to a Kalman filter is in no way intended to limit the scope of the invention that in fact encompasses use of any statistical filter or predictor of a known type.

For the sake of simplicity, it will be assumed that the mobile terminal to be located is still (i.e. not in motion), and the additional measurement provided to the location system is the altitude above sea level of the terminal. The measurements provided by the terrestrial cellular networks are typically the propagation times of the radio frequency signals.

According to basic EKF theory, such a scenario can be described as follows.

$$\begin{cases} \bar{x}_{k+1} = f(\bar{x}_k) + \bar{w}_k \\ \bar{y}_k = h(\bar{x}_k) + \bar{e}_k \\ g(\bar{x}_k) = \bar{d}_k \end{cases} \quad (1)$$

The vector $\bar{x}$ is the unknown variable of the problem that is to be evaluated via the Kalman iterative process.

In the present case, the vector $\bar{x}$ includes:

the three coordinates x, y, z of the mobile terminal to be located, and, additionally, a further state t that represents the average error of the network measurements $\bar{y}$ (terrestrial and/or satellite-based) whereby $$\bar{x}_k = [x_k y_k z_k t_k]^T$$

Since the mobile terminal to be located is assumed to be still then one has $\bar{x}_k = \bar{x}_{k+1}$ and consequently $f(\bar{x}_k) = \bar{x}_k$.

The vector function $h(\bar{x}_k)$ describes those measurements that are carried out that, in the case considered, correspond to the propagation times of the radio frequency signal from the base station. The function $h(\bar{x}_k)$ is comprised of as many functions as the measurements available at the k-th step and, for instance at the k-th step the i-th measurement $y_{i,k}$ will give rise to the equation:

$$y_{i,k} = h_i(\bar{x}_k) + \bar{e}_k = \text{GeometricDistance}(\text{MobileTerminal}_{step\_k}, \text{BaseStation}) + t_k + \bar{e}_k$$

where $t_k$ describes the non-zero average value of the measurement error $e_k$.

Therefore, according to a feature of present invention, $e_k$ is assumed as having a known distribution, i.e. a Gaussian distribution having a zero average value, and $t_k$ is assumed to be an unknown value to be calculated. In general $t_k$ represents the non zero average value of the measurements both:

in case of additive errors;

in case of multiplicative errors.

The vector function $g(\bar{x}_k)=d_k$ describes the constraints of the location system that render such a system more precise with respect to the case where this additional information were not available. In the instant case $g(x_k)=z_k$ (that is the altitude coordinate) and $d_k$ is the altitude above sea level provided by means of an altimeter.

Finally, $\bar{w}_k$ and $\bar{e}_k$ are two mutually independent Gaussian processes.

The system corresponding to equation (1) above is solved, by resorting to Kalman filter theory, by means of the iterative process described by the following system indicated as (2). Specifically, the iterative process starts from the initial condition $\tilde{x}_0$ and produces a sequence of solutions $\bar{x}_k$ gradually converging towards the position of the system to be located.

$$K_k = AH_k(H_k^T \Sigma_k H_k + R)^{-1}$$

$$\hat{x}_{k+1} = f(\tilde{x}_k + K_k(\vec{y}_k - h(\tilde{x}_k))) + b(\tilde{u}_k)$$

$$\Sigma_{k+1} = F_k(I - K_k H^T) \Sigma_k F_k^T + Q$$

$$\tilde{x}_{k+1} = \hat{x}_{k+1} - \Sigma_{k+1} D^T (D \Sigma_{k+1} D^T)^{-1} (D \hat{x}_{k+1} - p) \quad (2)$$

where $H_k^T$ is the matrix of the partial derivatives of the function $h(x)$ evaluated for $\vec{x} = \hat{x}_k$;

$F_k$ is the matrix of the partial derivatives of the function $f(\vec{x})$ evaluated for $\vec{x} = \hat{x}_k$; and $$D = g'(\tilde{x}_{k+1}) \text{ and } p = d - g(\tilde{x}_{k+1}) + g'(\tilde{x}_{k+1}) \tilde{x}_{k+1}.$$

It will be appreciated that all of the foregoing is well known to those of skill in the art of statistical filters or predictors especially in connection with Kalman filter theory, thereby making it unnecessary to provide a more detailed description herein.

The location method considered in the foregoing is better shown in FIG. 1.

FIG. 1 is comprised of functional diagram that is essentially similar to a flow chart identifying four basic phases comprising the method described herein, such basic phases being designated 1 to 4, respectively.

The phase designated 1 essentially involves extracting the information necessary for location purposes from:

a terrestrial cellular system T, a satellite-based system S, and other source of location information, generally designated A.

Such additional measurement sources may include the altitude information (i.e., the coordinate z) and/or (especially for applications in the automotive field) measurements indicative of the distance traveled by a motorcar over a given time interval.

It will be appreciated that the criteria and methods for obtaining those signals are well known in the art, thus making it unnecessary to provide a detailed description herein.

Reference 2 designates as a whole the phase wherein the initial conditions are estimated. Again, this occurs on the basis of methods that are well known in the art and, as such, are not significant for the purpose of understanding the invention.

The further phase 3 includes those steps that comprise the processing engine proper for calculating the position at the k-th step. Essentially, the phase designated 3 comprises the statistic filter processing and can essentially be regarded as including:

a first step 100 wherein the covariance matrixes and the system gain are updated, a second step 102 wherein the system states are updated, and a step 104 where the system states are filtered.

Finally, the phase designated 4 includes those steps that make the results of the location action available to the client (i.e. the party requesting the location information).

These results may be in the form of "raw" position information for tracking on a geographic identification system (GIS) or any other forms of position display.

In the block diagram of FIG. 2, a mobile terminal MS is shown representing the mobile terminal to be localized.

The mobile terminal MS is adapted to receive signals from a plurality of satellites Sat1, ..., Satm together with additional information for improving the accuracy of location action performed by the system.

To that purpose, the terminal MS includes a software module designated PCF1, essentially intended to implement a positioning calculation function according to the invention.

The satellites designated Sat1, ..., Satm transmit radio frequency signals adapted to permit to the mobile terminal MS to compute the distances of the mobile terminal MS to the various satellites.

The radio-frequency (radioelectric) signals transmitted from the satellites also include information required for exactly determining the positions of the satellite themselves. This occurs according to well-known criteria currently adopted in GPS systems of commercial type or other satellite systems.

References SRB1, ... SRBn designate a number of base stations (SRB or BTS) included in a terrestrial cellular communications system CA.

Those base stations transmit over the area covered by the network CA radio-frequency signals that permit the mobile terminal MS to compute the distance with respect to various base stations.

This occurs by means of power measurements (e.g. by measuring the signal power received at the mobile terminal from the various base stations) or by measurements of entities such as timing advance (TA), round trip time (RTT), observed time differences (OTD), observed time differences of arrival (OTDOA) and any other type of measurements currently available in a terrestrial mobile radio network for locating the mobile terminal MS based on a method generally known in the art.

Of course, the positions of the base stations are known a priori and stored in a geographical data base.

An altimeter system provides data indicative of the altitude above the sea level of the mobile terminal MS to be localized.

The altimeter in question is exemplary of an additional measurement system (AMS) that may provide additional information adapted to render the location action significantly more precise. This in respect of both the altitude coordinate z (which, of course, is an entity known very precisely, and not estimated) and the "plane" coordinates x and y, namely latitude and longitude.

Reference MLC designates as a whole a mobile location center adapted to cooperate with the mobile terminal MS via the mobile network CA.

The MLC system includes a bus-like arrangement of sub systems acting under the coordination of a management system designated SM.

The subsystems typically include a gateway GW towards the IP (Internet Protocol) world, thus permitting a remote user U to request and obtain the position of the mobile terminal MS. Such a function may be of interest for the delivery of so-called location based services (LBS) to the user of mobile terminal MS.

Reference PCF2 designates a positioning calculating function substantially duplicating the module PCF1 present in the mobile terminal MS for location purposes.

Reference MCG designates a communication management module currently associated with the mobile network CA. Essentially, the module MCG performs, for example, a number of tasks such as:
set-up the suitable communication (i.e., for example, Short Message Service (SMS), or General Packet Radio Service (GPRS)) between the user U and the terminal MS;
transmit information through the network.

Finally, reference AB denotes an accounting and billing module.

The flow chart of FIG. 3 depicts the various steps that are carried out when the user in possession of mobile terminal MS decides, in a start step 110, to activate the location procedure.

As a first step, designated 112, the terminal MS performs the various measurements on the radioelectric signals received both from the satellite network and from the terrestrial cellular network.

In a subsequent step 114, the mobile terminal MS collects the altitude information from the AMS system.

Subsequently, the terminal MS transmits, via the module MCG, all the measurements performed. This occurs in a step 116 that also leads the module MCG, after verifying the identity of the user via the SM and AB modules, to transfer the information received to the module PCF2.

In a step 118, the module PCF2 calculates the position of the mobile terminal MS and, via the module SM, re-transmits the results to the mobile terminal by possibly informing the billing module AB.

At that point, in a step 120, the terminal MS may collect new measurements and therefore prompt an iterative process leading to the terminal MS being "tracked" over time by reporting the position information just computed to the user.

When the location function is satisfactorily completed, the system evolves to an end step 122.

In an alternative, at present preferred embodiment to the arrangement shown herein, the position of the mobile terminal is computed (step 116) with the mobile terminal itself, by exploiting the processing capability of the respective module designated PCF1.

Any mobile telecommunication terminal provided with a certain degree of signal processing availability (such as mobile terminals of the so-called "Smartphone" type) are equipped with sufficient data processing power to perform such processing tasks.

If such a solution is adopted, the MLC system plays a support role by providing the mobile terminal MS with information including e.g. the positions of the base stations of the cellular network CA. Communication takes places via the MLC modules.

Still alternatively, the location action may not be prompted by the user in possession of the terminal MS but rather by a remote user U connected via the IP network.

In that case, the module GW permits such a remote user to access the location system after verifying its identity thereof via the module AB. At this point, acting under the supervision of the module SM, the system MLC sends the request to perform the location action and report all the measurements available to the mobile system MS by activating either of the functions PCF1 or PCF2 as soon as these measurements are received.

The results of location are then reported to the remote user U while simultaneously activating the billing module AB.

Such a location action prompted by a remote user U can be made subservient to a specific authorization being granted positively by the mobile terminal MS e.g. by the user pressing a given key in that terminal. Still otherwise, for privacy purposes, the mobile terminal MS may notify the system MLC that no request for location prompted by a remote user U should be processed by the system.

As previously indicated, several additional variants of the basic arrangement described previously can be easily conceived.

For instance a first variant provides for the possibility of dispensing with any measurements carried with the support of the satellite-based system. Essentially, this variant corresponds to deleting from the basic layout of FIG. 1 the block designated S, while leaving in place both blocks designated T (measurement from the terrestrial network) and A (other measurements system).

Another variant dispenses also with the information provided by the additional measurements designated A. In that case, location is performed on the basis of the sole information derived from the terrestrial system T.

Those of skill in the art will appreciate that those exemplified in the foregoing are just two of the many possible variants.

Any of the arrangements disclosed herein can be advantageously adopted in an automotive scenario as schematically shown in FIG. 4. In that figure, reference M designates a vehicle such as a motorcar equipped with a standard GPS receiver 201 as well as a terminal for terrestrial cellular mobile network 202. The vehicle M is also equipped with measurement system 203 adapted for measurement, e.g., the distance traveled by the vehicle M over a given interval of time. All the elements considered in the foregoing are preferably connected via a bus arrangement. This is preferably in the form of a so-called "CAN BUS" characterized with a high degree of robustness to environment noise.

Reference 204 designates a processing module essentially corresponding to the module designated PCF1 in FIG. 2. Such a module calculates the position of the motor vehicle M by resorting to the method considered in the foregoing based on the use of statistic filters. Finally, reference 205 designates a system for managing location information preferably including displayed unit adapted for presenting the result of the location action to the driver of the motor vehicle M.

Of course, without prejudice to the underlying principles of the invention, the details and embodiments may vary, also significantly, with respect to what has been described by way of example only, without departing from the scope of the invention as defined by the annexed claims.

The invention claimed is:

1. A method for determining at least one location coordinate of a mobile terminal with respect to a set of reference elements adapted to send radioelectric signals toward said mobile terminal, comprising the steps of:

measuring said radioelectric signals to derive respective measurements, said measurements being affected by measurement errors;

subjecting such respective measurements to state-based statistical filtering, said state-based statistical filtering comprising;

selecting at least part of said set reference elements as terrestrial reference elements;

providing at least one first state representative of said at least one location coordinate;

providing at least one further state in addition to said at least one first state, said at least one further state being representative of said measurement errors having non-zero mean; and performing said state-based statistical filtering on said respective measurements, using said at least one first state and said at least one further state in said state-based statistical filtering to determine said at least one location coordinate of said mobile terminal.

2. The method of claim 1, wherein said statistical filtering is Kalman filtering.

3. The method of claim 1, comprising the step of associating with said respective measurements at least one additional measurement indicative of at least one of a location and displacement of said mobile terminal.

4. The method of claim 3, comprising the step of measuring an altitude coordinate of said mobile terminal.

5. The method of claim 1, comprising the step of including in said set of reference elements at least one satellite-based reference element of a satellite-based positioning system.

6. The method of claim 1, wherein measuring said radioelectric signals comprises the step of determining at least one parameter selected from the group consisting of: power received at said mobile terminal from said set of reference elements, timing advance, round trip time, observed time differences, and observed time differences of arrival.

7. The method of claim 1, comprising the step of selecting at least part of said set of reference elements as elements comprising, together with said mobile terminal, a terrestrial cellular communication system.

8. A method for determining at least one location coordinate of a mobile terminal with respect to a set of reference elements adapted to send radioelectric signals toward said mobile terminal, comprising the steps of:

including in said set of reference elements both terrestrial reference elements and at least one satellite-based reference element of a satellite-based positioning system;

measuring said radioelectric signals to derive respective measurements, said measurements being affected by measurement errors;

subjecting said respective measurements to state-based statistical filtering, said state-based statistical filtering comprising;

providing at least one first state representative of said at least one location coordinate;

providing at least one further state in addition to said at least one first state, said at least one further state being representative of said measurement errors having non-zero mean;

associating with said respective measurements at least one additional measurement indicative of at least one of a location and displacement of said mobile terminal; and performing said state-based statistical filtering on said respective measurements, using said at least one first state and said at least one further state in said state-based statistical filtering to determine said at least one location coordinate of said mobile terminal.

9. A system for determining at least one location coordinate of a mobile terminal with respect to a set of reference elements adapted to send radioelectric signals toward said mobile terminal, comprising:

at least one measuring module for measuring said radioelectric signals and deriving respective measurements, said respective measurements being affected by measurement errors; and at least one processing module adapted for performing state-based statistical filtering on said respective measurements, at least a part of said set of reference elements being terrestrial reference elements, and said at least one processing module being configured to:

include in said statistical filtering at least one first state representative of said at least one location coordinate;

include in said statistical filtering at least one further state in addition to said at least one first state, said at least one further state being representative of said measurement errors having non-zero mean; and perform said state-based statistical filtering on said respective measurements using said at least one first state and said at least one further state to determine said at least one location coordinate of said mobile terminal.

10. The system of claim 9, wherein said statistical filtering is Kalman filtering.

11. The system of claim 9, comprising at least one measurement source providing at least one additional measurement to be associated with said respective measurements, said at least one additional measurement being indicative of at least one of a location and displacement of said mobile terminal.

12. The system of claim 11, comprising an altimeter for measuring an altitude coordinate of said mobile terminal.

13. The system of claim 9, wherein said set of reference elements comprises at least one satellite-based reference element of a satellite-based positioning system.

14. The system of claim 9, wherein said at least one measuring module is configured for determining at least one parameter selected from the group consisting of: power received at said mobile terminal from said set of reference elements, timing advance, round trip time, observed time differences, and observed time differences of arrival.

15. The system of claim 9, wherein at least part of said set of reference elements comprises, together with said mobile terminal, a terrestrial cellular communication system.

16. The system of claim 15, wherein at least one of said measurement module and said processing module includes a first portion hosted by said mobile terminal and a second portion hosted by a location center, wherein said first and second portions are arranged for data exchange over said terrestrial cellular communication system.

17. A system for determining at least one location coordinate of a mobile terminal with respect to a set of reference elements adapted to send radioelectric signals toward said mobile terminal, comprising:

both a set of terrestrial reference elements and at least one satellite-based reference element of a satellite-based positioning system as said reference elements;

at least one measuring module for measuring said radioelectric signals to derive respective measurements, said respective measurements being affected by measurement errors;

at least one processing module configured to perform state-based statistical filtering on said respective measurements, wherein the at least one processing module:
  includes in said statistical filtering at least one first state representative of said at least one location coordinate,
  includes in said statistical filtering at least one further state in addition to said at least one first state, said at least one further state being representative of said measurement errors having non-zero mean, and
  performs said state-based statistical filtering on said respective measurements using said at least one first state and said at least one further state to determine said at least one location coordinate of said mobile terminal; and
at least one measurement source providing at least one additional measurement to be associated with said respective measurements, said at least one additional measurement being indicative of at least one of a location and displacement of said mobile terminal.

18. A mobile terminal configured for determining its location coordinates with respect to a set of reference elements adapted to send radioelectric signals toward said mobile terminal, comprising:
  a measuring module for measuring said radioelectric signals and deriving respective measurements, said respective measurements being affected by measurement errors; and
  a processing module adapted for performing state-based statistical filtering on said respective measurements, the mobile terminal comprising together with at least part of said set of reference elements, a terrestrial communication system, and said processing module being configured to:
    include in said statistical filtering at least one first state representative of said location coordinates,
    include in said statistical filtering at least one further state in addition to said at least one first state, said at least one further state being representative of said measurement errors having non-zero mean, and
    perform said state-based statistical filtering on said respective measurements using said at least one first state and said at least one further state to determine said location coordinates of said mobile terminal.

19. The mobile terminal of claim 18, wherein said statistical filtering is Kalman filtering.

20. The mobile terminal of claim 18, wherein said mobile terminal has at least one measurement source providing at least one additional measurement to be associated with said respective measurements, said at least one additional measurement being indicative of at least one of a location and displacement of said mobile terminal.

21. The mobile terminal of claim 20, wherein said mobile terminal has an altimeter for measuring an altitude coordinate of said mobile terminal.

22. The mobile terminal of claim 20, wherein said mobile terminal is mounted on a vehicle, and said at least one additional measurement is indicative of at least one of a location and displacement of said vehicle.

23. The mobile terminal of claim 18, wherein said measuring module is configured for determining at least one parameter selected from the group consisting of: power received at said mobile terminal from said set of reference elements, timing advance, round trip time, observed time differences and observed time differences of arrival.

24. A mobile terminal configured for determining its location coordinates with respect to a set of reference elements adapted to send radioelectric signals toward said mobile terminal, said set of reference elements including both terrestrial reference elements and at least one satellite-based reference element of a satellite-based positioning system, said mobile terminal comprising:
  a measuring module for measuring said radioelectric signals to derive respective measurements, said respective measurements being affected by measurement errors;
  a processing module configured to perform state-based statistical filtering on said respective measurements, wherein the processing module:
    includes in said statistical filtering at least one first state representative of said location coordinates,
    includes in said statistical filtering at least one further state in addition to said at least one first state, said at least one further state being representative of said measurement errors having non-zero mean, and
    performs said state-based statistical filtering on said respective measurements using said at least one first state and said at least one further state to determine said location coordinates of said mobile terminal; and
  at least one measurement source associated to said mobile terminal and providing at least one additional measurement to be associated with said respective measurements, said at least one additional measurement being indicative of at least one of a location and displacement of said mobile terminal.

25. A non-transitory computer readable medium encoded with a computer program product loadable into a memory of at least one computer, the computer program product comprising software code portions for performing the method of any one of claims 1 to 8.

26. A non-transitory computer readable medium encoded with a computer program product loadable into a memory of a computer and including software code portions for implementing the mobile terminal of any one of claims 18 to 24.

* * * * *